Dec. 26, 1961 W. C. BENZING ET AL 3,014,791
PYROLYSIS APPARATUS
Filed Oct. 1, 1958
FIG. 1
FIG. 2
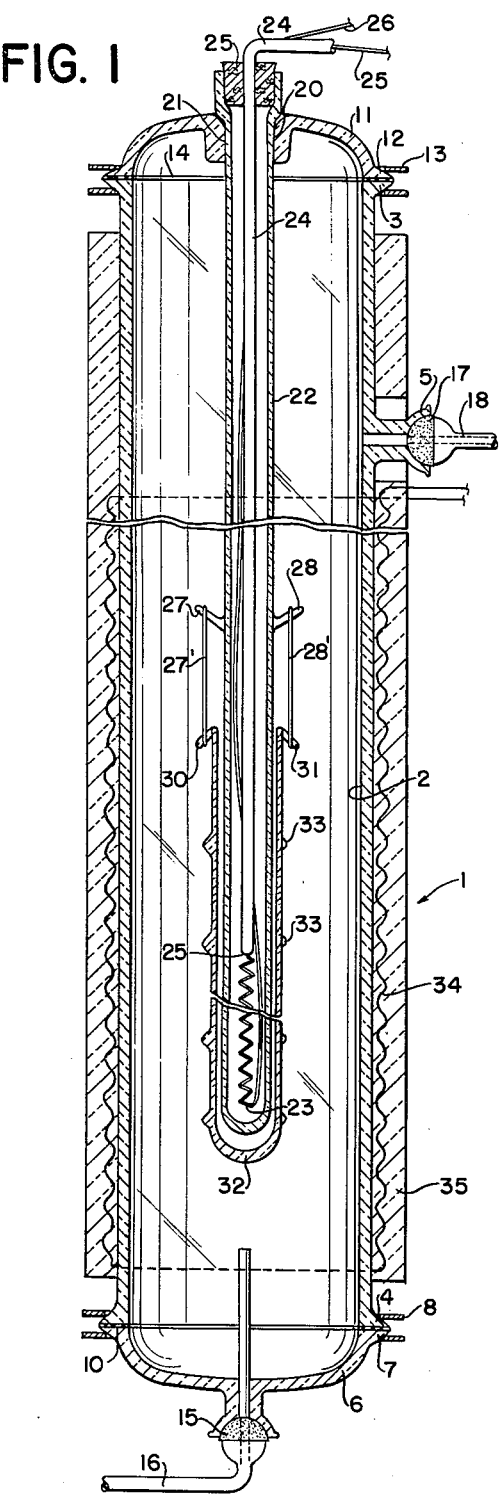
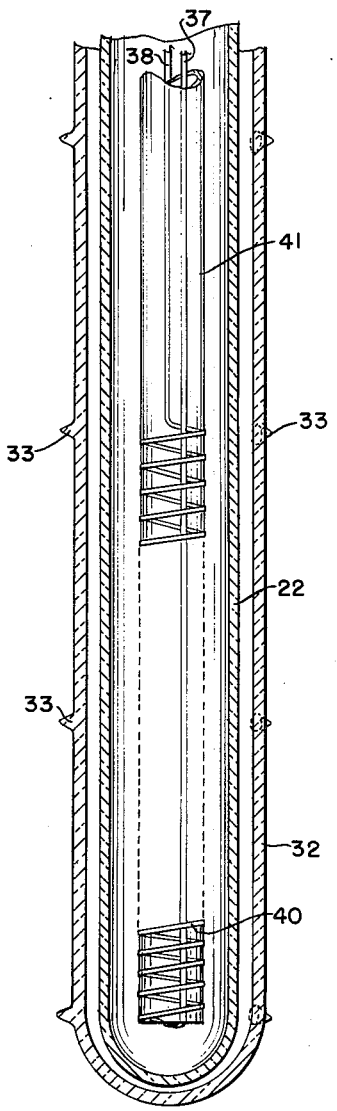
INVENTORS
WALTER C. BENZING
EDWARD C. SCHAARSCHMIDT
ROBERT E. GRAMMER
BY Marion L. McCurdy
ATTORNEY 3,014,791
PYROLYSIS APPARATUS
Walter C. Benzing, Metuchen, Edward C. Schaarschmidt, Cranford, and Robert E. Grammer, Elizabeth, N.J., assignors to Merck & Co., Inc., Rahway, N.J., a corporation of New Jersey
Filed Oct. 1, 1958, Ser. No. 764,646
1 Claim. (Cl. 23—273)

This invention relates to apparatus for the pyroylsis of silanes, and has for its object the provision of an improved apparatus for the formation of elemental hyper-pure crystalline silicon.

As is already known, silicon can be prepared in a relatively pure state by various procedures. The silicon product will, however, contain traces of metal contaminants. For the most sensitive electronic uses, silicon of higher purity is required because the presence of even trace amounts of impurities proves detrimental for the most exacting semiconductor requirements, especially in the newer electronics applications, such as transistors.

Among the objects of this invention is an improved apparatus for the production of hyper-pure elemental silicon by the pyrolysis of silanes. A further object is to provide an apparatus for the production of hyper-pure elemental silicon of improved electrical semiconductor quality.

The objects of this invention are accomplished in an improved apparatus for producing elemental silicon which comprises an enclosed and gas tight reactor chamber which may be operated under various pressures having means for introducing silane gas and removing the liberated hydrogen to maintain a desired operating pressure within the chamber, and means for heating silanes to its decomposition temperature and depositing the silicon.

The gas confining exterior reactor chamber of the apparatus is advantageously formed of a cylindrical elongated vessel mounted in an upright position having removably closed ends to provide an enclosed heated space for a pyrolysis unit mounted therein. The chamber is provided with duct means for the supply of silanes, duct means for the removal of hydrogen or other gas, and heating means. The pyrolysis unit comprises a heated pyrolysis element, preferably having exterior protrusions for the deposition of silicon, disposed within the chamber and arranged to be contacted with the silane gas. In one embodiment of the invention, the pyrolysis element is formed of fused quartz, for example, a quartz tube. The quartz tube may be of any suitable size or shape, advantageously cylindrical and closed at the lower end, and constructed to provide for the mounting of a heating means therein. In an effective embodiment of the invention, an electrical heating element is mounted within another fused quartz tube which is arranged with the quartz pyrolysis element. The cylindrical vessel of the chamber may be heated exteriorly to serve as a thermal barrier. The pyrolysis element is, accordingly, heated on the inside by the heating element and from the outside from the reactor chamber.

These and other novel features of the invention will be better understood after considering the following discussion with reference to the accompanying drawings, in which:

FIG. 1 is a vertical sectional view of an arrangement of apparatus embodying the invention, and FIG. 2 is a fragmentary enlarged vertical sectional view of another form of pyrolysis unit of the invention.

The apparatus illustrated in FIG. 1 of the drawings comprises a reactor chamber 1 consisting of an upright cylindrical vessel 2 having flanges 3 and 4 at the top and bottom respectively, and an outlet connection 5. At the bottom, a closure head 6 having a flanged rim 7 is connected by a metal flange coupler 8 to the flange 4 and the connection is sealed with a Teflon gasket 10. At the top the closure head 11 having a flanged rim 12 is connected by a metal flange coupler 13 to the flange 3, and the connection is also sealed with the Teflon gasket 14. The couplers 8 and 13 may be aluminum split bands with bolt connections (not shown) to draw them tightly around the flanges and press the flanges into sealed contact with the gaskets 10 and 14. The cylindrical part 2 and the closure heads 6 and 11 may be made of any suitable material that will withstand the operating temperature of about 400° C. and be inert to the contained material. For operations of laboratory or pilot types these members may be made of borosilicate glass.

The bottom closure head (when made of glass) has a ball and socket joint 15 for the connection thereto of the supply duct 16, a glass tube, to introduce the silane gas into the reactor chamber. The outlet 5 is also provided with a ball joint 17 for the removal of hydrogen from the reactor chamber through duct 18. This duct may be connected to a vacuum pump.

When the closure head 11 is made of glass, the central portion has a tapered ground joint 20 for receiving the ground collar 21 of the tube 22 in sealed connection. This tube is preferably formed of fused quartz which is closed at the bottom and has an interior heating element 23 formed of Nichrome wire supported near the bottom. A quartz capillary tube 24 is inserted into the tube 22 and held in its supporting position by the packing plug 25. The element 23 is connected to one electrical lead 25 which passes through the quartz tube 24 and to the other electrical lead 26 which passes upward on the outside of the tube 24. This electrical circuit is connected to any desired source of power, for example, to a power input of about 600 volt-amperes, to heat the coil 23 to about 1000° C.

The quartz tube 22 has two protruding integral quartz lugs 27 and 28 fused thereon which serve as hangers for the wires 27' and 28' which are hooked over the integral brackets or lugs 30 and 31 on the quartz pyrolysis element 32 to hold it in its suspended position surrounding, and preferably concentric with, the tube 22. The element 32 is heated to its operating temperature of 600° to 800° C., mainly by the radiant energy from the element 23. In order to facilitate the deposition and growth of dense crystalline silicon, the exterior of the pyrolysis element 32 has a multiplicity of projections 33 arranged, say, 120° apart circumferentially and spaced about 1.5 inches apart longitudinally on the exterior, which serve as nuclei for the starting and growth of the depositions.

In order to facilitate a better control over the heating of element 32, the reactor chamber 2, has a surrounding coil of Nichrome wire 34, wrapped, say, at ¼ inch intervals and supplied, for example, with 300 volt-amperes of power. The heating wire is covered with an asbestos insulation 35.

In one arrangement of apparatus as shown in FIG. 1, the reactor chamber was 30 inches long, 4 inches in diameter, made of Pyrex glass, the pyrolysis element 32 was 14 inches long and almost 1 inch in diameter on the outside about ⅔ inch in diameter inside. In carrying out an operation in an apparatus having these dimensions the pyrolysis element was heated to a temperature of about 800° C. and the chamber was evacuated and swept free of reactive gas with hydrogen, maintained at ½ to atmospheric pressure is added and an inert gas such as helium, argon or nitrogen inert gas is added. Silane gas is passed into the chamber through tube 16. At the start of the operation, the heating element 23 was set with its lower end about 6 inches from the lower head closure 6 and was lowered about 2 inches after each 8 moles (256 gms.) of silane have passed into the chamber. This lowering of the element was done by sliding the glass tube 24 through the stopper 25. The operation was stopped when 32 moles were passed into the chamber. Silane-hydrogen mixtures of varying proportions for example, up to 60% silane concentration have been pyrolyzed. The temperature may be measured by Chromel-Alumel thermocouples placed inside the reactor chamber.

Polycrystals of dense silicon form on the quartz protrusions 33 and grow to a large cylindrical deposit on the pyrolysis element 32. For example, the deposits formed on the aforementioned apparatus have been 7 inches long, 2½ inches in diameter weighing about 450 grams. At the end of the run the closure 6 is removed and the pyrolysis element with its deposit of polycrystalline silicon is removed from the reactor chamber. The silicon is separated by shattering the reactor element.

FIG. 2 illustrates a modification of the apparatus of FIG. 1 on an enlarged scale. The tube 22 and the pyrolysis element 32 are as shown in FIG. 1. The tube 35 passes through a friction plug such as 25 of FIG. 1 and has one of the power leads 37 on the inside and the other 38 on the outside. These wires are connection in series with the flat Nichrome wire 40 which is helically wound around the outside of the tube 41. The bottom of the tube is open to permit the wire 37 to pass around the lower end and connect with the lower end of the heating element 40.

The following experimental part illustrates in detail the operation of our novel apparatus, however, this invention is not to be construed as limited thereby in spirit or in scope since it will be apparent to those skilled in the art that many modifications in materials and methods may be made without departing from the invention.

*Example 1*

A mixture of silane and helium was passed through the apparatus described in FIG. 1 with the exception of a smooth wall central heating tube at the stated operating temperatures. A 143 gm. deposit of amorphous powder silicon was formed on the reactor walls and 7 grams of crystalline silicon were formed on the central heating tube. This represents a total yield of 89% of which 85% was powder yield and 4% was crystalline silicon.

*Example 2*

A mixture of silane and helium was passed through the apparatus described in FIG. 1 and FIG. 2 at the stated operating temperatures. A 197 gm. deposit of amorphous powder silicon was formed on the reactor wall and 163.5 gm. crystalline silicon was formed on the central heating element. This represents a 92% yield of silicon of which 41.7% is crystalline yield and 50.3% is amorphous powder yield.

*Example 3*

A mixture of silane and hydrogen was passed simultaneously (in parallel) through three apparatus as described in FIGS. 1 and 2 at the stated operating temperatures. Deposits of 343 gm. crystalline silicon and 86 gm. amorphous powder silicon were obtained in the first reactor. Deposits of 472 gm. crystalline silicon and 106 gm. powdered silicon were obtained in the second unit. Deposits of 453 gm. crystalline and 68 gms. powder in the third unit were realized. The total yield of crystalline silicon was 58% and the powder yield 16.5%. Total 74.5%.

*Example 4*

A mixture of silanes and hydrogen was passed simultaneously (in parallel) through three apparatus as described in FIGS. 1 and 2 at the stated operating temperatures. Deposits of 486 gm. of crystalline silicon and 126 gm. of amorphous powder silicon were obtained in the first reactor. Deposits of 470 gms. of crystalline silicon and 83 gm. of amorphous powder silicon were obtained in the second unit. Deposits of 475 gms. of crystalline and 141 gms. of amorphous silicon in the third unit were realized. The total yield of crystalline silicon was 65.5% and the amorphous silicon yield was 16%. Total 81.5%.

Various changes and modifications may be made in the present invention, certain preferred embodiments of which are herein disclosed without departing from the scope thereof; to the extent that these changes and modifications are within the scope of the appended claim they are to be considered a part of this invention.

We claim:

Apparatus for the pyrolysis of silane to produce elemental hyper-pure silicon in a high yield of crystalline silicon and a low yield of amorphous silicon, said apparatus comprising, in combination: an enclosed reactor chamber having ducts for the supply and removal of gas, said reactor chamber including an elongated upright vessel, a head closure for the vessel having an opening therein, and an elongated quartz tube mounted in the opening and extending into the reactor chamber; an electrical heating unit inside the quartz tube; and a tubular quartz pyrolysis element mounted exteriorly around and close to said quartz tube and within the reactor chamber, said tubular quartz pyrolysis element having a multiplicity of small protrusions relatively widely spaced over the exterior surface of the element which serve as nuclei for the starting and growth of crystalline silicon, said heating element, in the operation of the apparatus, heating said pyrolysis element to the decomposition temperature of silane.

References Cited in the file of this patent
UNITED STATES PATENTS

| | | |
|---|---|---|
| 2,759,855 | Medcalf | Aug. 21, 1956 |
| 2,763,581 | Freeman | Sept. 18, 1956 |
| 2,836,524 | Brenner | May 27, 1958 |